United States Patent Office 3,287,291
Patented Nov. 22, 1966

3,287,291
DIORGANOSILOXANES CURED WITH AN ALK-OXY END-BLOCKED SILYL TETRAFORMAL
Hans H. Ender, Buffalo, N.Y., assignor to Union Carbide Corporation, a corporation of New York
No Drawing. Filed July 12, 1962, Ser. No. 209,283
12 Claims. (Cl. 260—18)

This invention relates to room temperature curable organosiloxane compositions. More particularly, this invention is directed to compositions containing hydroxy end-blocked organosiloxane fluids and tetrafunctional silyl-oxymethylene compounds and to the elastomers produced therefrom.

The present invention is based, in part, upon the discovery that compositions comprising (1) a diorgano-polysiloxane fluid containing an average of about two silicon bonded hydroxy groups per molecule and (2) an organosilicon compound represented by the formula:

(A)  $Si[OCH_2)_nOR]_4$ wherein each $n$ is an integer having a value from one to about five or greater and each R is an alkyl group containing from one to about four carbon atoms, are curable to organosiloxane elastomers at room temperature. The compositions can also contain, if desired, a filled and/or a catalyst to increase the rate of cure, a metal salt of a carboxylic acid.

The hydroxy-containing diorganopolysiloxane fluids which can be employed in the compositions of this invention are comprised of essentially linear polymeric chains composed of units of the formula:

(B)  $[RR'SiO]$

In the above formula, R and R' represent organic radicals, as for example, monovalent hydrocarbon groups such as alkyl, aryl, alkaryl, aralkyl, cycloalkenyl, and alkenyl groups including methyl, ethyl, propyl, butyl, isooctyl, octadecyl, phenyl, phenylethyl, naphthyl, cyclopentyl, cyclohexyl, vinyl, allyl, dodecenyl, cyclohexenyl and the like; and carbon-functional groups which are substituted hydrocarbon groups bonded to the silicon atom through a carbon to silicon linkage and in which groups the carbon-functional substituent is removed by at least two carbon atoms of a saturated hydrocarbon chain from silicon. Typical of such carbon-functional groups are: beta-cyanoethyl, gamma-cyanopropyl, cyanophenyl, gamma-nitropropyl, nitropropyl, chlorophenyl, difluorophenyl, the fluorinated alkyl groups such as gamma, gamma, gamma-trifluoropropyl and the like. Preferably the groups R and R' each contain from one to about 18 carbon atoms.

The diorganopolysiloxane fluids useful in this invention also contain an average of two silicon bonded hydroxy groups per molecule. The hydroxy groups can be attached to terminal silicon atoms as end-blocking (chain terminating) groups, or can be attached to any of the non-terminal silicon atoms. When hydroxy groups are attached to a non-terminal silicon atom they replace the R and/or R' groups in the units represented by Formula B above. Preferably, the diorganopolysiloxane fluids useful in this invention have a hydroxy group bonded to each terminal silicon atom.

The hydroxy-containing organopolysiloxane fluids are further characterized by viscosities at 25° C. of from about 100 centipoises up to about 2,000,000 centipoises and preferably in the range of from about 1,000 to about 50,000 centipoises. For the most part such organopolysiloxanes will vary from pourable liquids to viscous fluids which will slowly flow when poured. Such organopolysiloxanes are further characterized by an organic group to silicon atom ratio of from about 1.95:1 to 2:1.

The tetrafunctional silyl-oxymethylene compounds suitable for use in the present invention are those represented by Formula A above. In Formula A, the value of $n$ and the number of carbon atoms in the R group can be the same or different in each of the four oxy-methylene chains attached to the silicon atom. R can be, for example methyl, ethyl, isopropyl, n-butyl or t-butyl.

A preferred class of compounds of this invention are those represented by the formula:

(C)  $Si[(OCH_2)_nOCH_3]_4$ wherein each $n$ is an integer having a value from one to two, inclusive.

Illustrative examples of the compounds represented by Formula A are:

(a)  $Si(OCH_2OCH_3)_4$ (b)  $Si[(OCH_2)_5OC_4H_9]_4$ (c)
$$H_3COCH_2OCH_2O\diagdown_{Si}\diagup OCH_2OC_2H_5$$
$$H_3COCH_2O\diagup\phantom{Si}\diagdown OCH_2OCH_2OC_2H_5$$

(d)
$$H_3CO(CH_2O)_4\diagdown_{Si}\diagup(OCH_2)_3OCH_3$$
$$H_3CO(CH_2O)_2\diagup\phantom{Si}\diagdown OCH_2OCH_3$$

and the like.

The compounds of Formula A can be prepared by a process which comprises effecting reaction between a silicon tetrahalide represented by the formula $SiX_4$, wherein X is chlorine or bromine, and formaldehyde by adding a solution of $SiX_4$ in an inert liquid organic solvent to a mixture of a basic hydrogen halide acceptor and formaldehyde dissolved in an alcohol represented by the formula ROH, wherein R has the meaning defined hereinabove with reference to Formula A, while maintaining the combined reaction mixture at a temperature between about −20° C. and about 30° C., preferably between about 0° C. and about 20° C. The best yields of the compounds of Formula A are obtained when the reaction is carried out under anhydrous conditions, although satisfactory yields can be obtained in the presence of limited amounts of water. It is also preferred to maintain the pH of the combined reaction mixture in the range from about 7 to about 9. This can be conveniently done by choosing a hydrogen halide acceptor of the proper basicity and by adjusting the concentration of the hydrogen halide acceptor.

The formaldehyde dissolved in alcohol can be prepared in situ by bubbling $CH_2O$ gas into a mixture of hydrogen halide acceptor and alcohol, or a previously prepared solution of $CH_2O$ in alcohol can be employed. A convenient commercial source of formaldehyde dissolved in alcohols are the "Formcels." The compositions of typical Formcels are as follows.

| Formaldehyde Source | Alcohol (ROH) | Formaldehyde, Percent by Weight | Alcohol, Percent by Weight | Water, Percent by Weight |
|---|---|---|---|---|
| Methyl Formcel | Methanol | 55 | 33 | 12 |
| N-propyl Formcel | N-propanol | 40 | 51.5 | 8.5 |
| Iso-butyl Formcel | Iso-butanol | 40 | 51.5 | 8.5 |
| N-butyl Formcel | N-butanol | 40 | 51.5 | 8.5 |

The amounts of water present in Formcels tend to reduce the yield of compounds of Formula A by only a small amount over yields obtained under anhydrous conditions.

Preferably, $SiCl_4$ is employed as the silicon tetrahalide, di-isopropyl ether as the solvent for both the $SiCl_4$ and the Formcel and pyridine as the hydrogen halide acceptor.

Preferably the reaction mixture is stirred during the addition of the SiCl₄ solution and for about 30 minutes after addition is completed. The desired product of Formula A can be recovered by filtering off precipitated pyridine hydrocholoride and removing solvents and other low boiling materials from the filtrate by distillation under reduced pressure, the compound of Formula A remaining in the distillation flask. This process is illustrated by Example 2 hereinbelow.

The nature of the R groups in the compounds of Formula A depends on the particular alcohol ROH employed in the process of this invention. When the alcohol is methanol, the R groups are methyl groups (and Formula A becomes $Si[(OCH_2)_nOCH_3]_4$, where each $n$ is an integer of from 1 to about 5 or greater), while the use of butanol introduces butyl groups into the compounds of Formula A. When a mixture of alcohols ROH is used, different R groups can be introduced into the same molecule of a compound of Formula A.

The value of $n$ in the compounds of Formula A depends upon the conditions employed in the process of this invention. Small values of $n$, on the order of 1 and 2, are favored by a low mole ratio of formaldehyde to $SiX_4$ in the reaction mixture, by fractional distillation temperatures above about 50° C. and by the presence of small amounts of water in the reaction mixture. Larger values of $n$, up to 5 or greater, are favored by a high mole ratio of formaldehyde to $SiX_4$ in the reaction mixture, by fractional distillation temperatures below about 50° C. and by anhydrous conditions. Thus the compounds of Formula C are best prepared using formaldehyde dissolved in methanol and a small amount of water, a relatively low ratio of $CH_2O$ to $SiX_4$ (on the order of 6 to 1 or less), and a fractional distillation temperature above about 50° C.

While a metal salt is not necessary to obtain a room temperature cure of the compositions of this invention a metal salt can be employed to reduce the time for the compositions to cure to elastomers.

The metal salts of carboxylic acids which can be employed as the catalyst in preparing the room temperature-curable compositions of the present invention include the carboxylic acid salts of lead, tin, zirconium, iron, cadmium, titanium, calcium and manganese. It is preferred that the carboxylic acid salts of the above metals be characterized by the property that each carboxylic acid radical contains from 3 to 13 carbon atoms. While the metal salts of acetic acid can be employed, it has been found that the acetic acid salts cause a rapid curing of the composition to elastomer so as to make such a system difficult to handle. While the metal salts containing 14 or more carbon atoms are operable to cure the compositions to elastomers, it has been found that such salts leave an oily residue in the elastomer thereby making the elastomer feel greasy to the touch. It is preferred that the salt be soluble in the hydroxy-containing diorganopolysiloxane fluid although insoluble salts can be employed if they are properly dispersed in the system. Typical of the metal salts of carboxylic acids which are operative are the naphthenates, propionates, butyrates, hexoates, oleates, benzoates, laurates, linoleates, stearates and octoates of the above metals.

While a filler is not necessary to form the room temperature curing compositions of this invention, a filler can be employed, if desired, to give higher tensile strengths to the elastomers produced.

The fillers which can be employed in the compositions of this invention are any of those commonly employed in the art and include, for example, titanium dioxide, silica of the fumed or precipitated type, calcium carbonate, diatomaceous earth, silica aerogel, carbon black and the like. When employing carbon black as the filler it is usually employed in combination with other fillers and is preferably not present in amounts more than 50 percent by weight of the total filler present. It is preferred that at least 50 percent by weight of the total filler constitute a finely divided silica.

The amount of the filler employed in the composition of this invention can be from 10 to 200 parts by weight per 100 parts by weight of the hydroxy-containing diorganopolysiloxane fluid. It is preferred to employ the filler in amounts of from 20 to 60 parts by weight filler per 100 parts by weight of the diorganopolysiloxane fluid.

The amount of the organosilicon compound of Formula A employed in the compositions of this invention can range from 0.1 to 10 parts by weight of such compound per 100 parts by weight of the diorganopolysiloxane fluid.

The metal salt of the carboxylic acid, which is employed as the catalyst for the room-temperature curable composition of the invention, can be employed in amounts of from 0.05 to 5.0 parts by weight per 100 parts by weight of the diorganopolysiloxane fluid. It is preferred that such catalyst be employed in amounts of from 1 to 2 parts by weight per 100 parts by weight of the diorganopolysiloxane fluid.

The hydroxy-containing diorganopolysiloxane fluid can be prepared by conventional procedures, for example by the steps of hydrolyzing or cohydrolyzing one or more monomeric silanes containing two silicon bonded hydrolyzable groups and treating the resulting hydrolyzate to prepare pure polymers in the form of cyclic siloxanes which are then subjected to equilibration (polymerization) procedures to yield essentially linear polymers of high molecular weight. Such polymers are then reacted with limited amounts of water and at elevated temperatures for varying periods of time to produce the desired starting hydroxy-containing diorganopolysiloxane.

Preparation of the room temperature curing composition is accomplished by simply thoroughly admixing the ingredients and permitting curing to take place. In most instances it will be preferred to add the compound of Formula A and/or the metal salt of the carboxylic acid last in order to prevent premature curing of the composition to an elastomer.

The mixture of hydroxy-containing diorganopolysiloxane fluid, compound of Formula A and the metal salt of the carboxylic acid (if employed) can be stored under refrigeration in closed containers, such as stoppered glass bottles, for periods of time up to several weeks without undergoing any extensive curing reaction. When the refrigerated mixtures are allowed to warm to room temperature, a rapid and uniform curing reaction takes place.

The room temperature curable compositions of this invention are useful in the production of organosiloxane elastomers at room temperature. The compositions of the invention are particularly useful in sealing, puttying and caulking applications.

The following examples serve to illustrate the invention; all parts are by weight unless otherwise specified.

*Example 1*

This example illustrates the preparation of a hydroxy end-blocked diorganopolysiloxane fluid.

Hexamethylcyclotrisiloxane (100 parts), water (45 parts) and ammonia (100 parts) were charged to an autoclave and heated to 150° C. for several hours. A dimethylpolysiloxane having a hydroxyl group bonded to each of the terminal silicon atoms thereof was obtained in about 75 percent yield. This dimethylpolysiloxane had a viscosity at room temperature of 50 centipoises, contained 3 percent by weight hydroxy groups and contained approximately 11 to 13 $[(CH_3)_2SiO]$ units per chain.

Approximately one gallon of the above material was mixed with 10 grams of calcium zeolite X, a synthetic zeolite, and heated to 150° C. for 35 hours to cause the material to condense and form a dimethylpolysiloxane fluid having a hydroxyl group bonded to each of the terminal silicon atoms thereof and having a higher viscosity. After cooling to room temperature, the calcium zeolite X was removed by filtration to yield a dimethylpolysiloxane fluid of 20,000 centipoises viscosity at room temperature and having a hydroxyl group bonded to each terminal silicon atom thereof.

*Example 2*

A three-necked, 2-liter Pyrex flask fitted with dropping funnel, stirrer and thermometer was charged with 327 grams (6 moles $CH_2O$) methyl Formcel, 350 grams (4 moles+10%) pyridine and 300 grams diisopropylether and the mixture was cooled to —20° C. The dropping funnel connected to the flask was charged with a mixture of 170 grams (1 mole) $SiCl_4$ dissolved in 300 grams dry diisopropylether. The $SiCl_4$ solution was added to the solution in the flask so slowly that the temperature in the flask never rose above 0° C. A voluminous precipitate of pyridinium hydrochloride formed. The excess pyridine produced a soft, pasty precipitate which separated easily from the diisopropylether solution. The precipitate was separated by decantation and washed repeatedly in the flask with 100 gram portions of dry diisopropylether until the ether did not extract any more oily substance.

The combined ether extracts were shaken with calcium chloride in order to eliminate excess pyridine and methanol, and were then filtered through a dry filter in a dry box. The clear solution was then distilled in vacuo at about 30° and finally at 60° C. and 2 mm. Hg pressure. About 171 grams of colorless oil remained in the distillation flask which was identified as a compound of this invention having the formula:

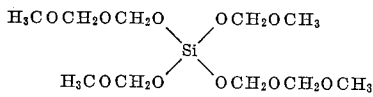

The yield was about 63 percent based on silicon tetrachloride. The product had the following properties:

Viscosity at 25° C., centipoises _____ 5
Specific gravity at 25° C. _____ 1.178
Refractive index 25° C. _____ 1.4148

Results of elemental analysis and molecular weight determination:

Calculated for—$C_{10}H_{24}O_{10}Si$: C=36.1%; H=7.2%; Si=8.5%; 6x($H_2CO$)=54%, mol. wt.=332. Found: C=36.2%; H=7.4%; Si=8.6%; 6x($H_2CO$)=53%; mol. wt.=347.

The compound $Si(OCH_2OCH_3)_4$ is prepared in a similar manner except that the final reaction mixture is distilled at temperatures up to a maximum of 130° C., rather than at a maximum of 60° C.

*Example 3*

About 7.4 grams (100 parts) of hydroxy end-blocked dimethylpolysiloxane fluid prepared according to the procedure of Example 1 but having a viscosity of 30,000 centipoises at normal room temperature were thoroughly mixed with about 0.5 grams (6.75 parts) of an organosilicon compound having the formula

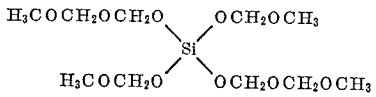

and about 0.1 gram (1.35 parts) of stannous octoate. The mixture solidified almost immediately to a rubberlike, non-sticky mass.

*Example 4*

A room temperature curing organosiloxane elastomer formulation is obtained when the compound
$Si(OCH_2OCH_3)_4$ is substituted for the compound

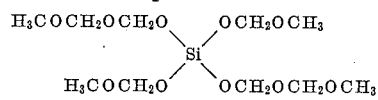

in the formulation of Example 3.

What is claimed is:

1. A composition of matter curable to an elastomer at room temperature which is stable when maintained under refrigeration in a closed container and which comprises (1) 100 parts by weight of a diorganopolysiloxane fluid having an average of about two silicon bonded hydroxy groups per molecule, said fluid being an essentially linear diorganopolysiloxane consisting essentially of units of the formula:

wherein R and R′ are monovalent organic radicals containing from 1 to about 18 carbon atoms, said fluid having a viscosity of from 100 centipoises to 2,000,000 centipoises at room temperature and having an organic group to silicon atom ratio of from about 1.95:1 to 2:1 and (2) from 0.1 to 10 parts by weight of an organosilicon compound of the formula:

$$Si[(OCH_2)_nOR]_4$$

wherein each $n$ is an integer having a value from one to about five, and each R is an alkyl group containing from one to about four carbon atoms.

2. A composition of matter curable to an elastomer at room temperature which is stable when maintained under refrigeration in a closed container and which comprises (1) 100 parts by weight of a diorganopolysiloxane fluid having a hydroxy group bonded to each of the terminal silicon atoms thereof, said fluid being an essentially linear diorganopolysiloxane consisting essentially of units of the formula:

wherein R and R′ are monovalent hydrocarbon radicals containing from 1 to about 18 carbon atoms, said fluid having a viscosity of from 1000 centipoises to 50,000 centipoises at room temperature and having a hydrocarbon group to silicon atom ratio of from about 1.95:1 to 2:1 and (2) from 0.1 to 10 parts by weight of an organosilicon compound of the formula:

$$Si[(OCH_2)_nOCH_3]_4$$

wherein each $n$ is an integer having a value from one to two, inclusive.

3. A composition of matter curable to an elastomer at room temperature which is stable when maintained under refrigeration in a closed container and which comprises (1) 100 parts by weight of a diorganopolysiloxane fluid having a hydroxy group bonded to each of the terminal silicon atoms thereof, said fluid being an essentially linear diorganopolysiloxane consisting essentially of units of the formula:

wherein R and R′ are monovalent organic radicals containing from 1 to about 18 carbon atoms, said fluid having a viscosity of from 100 centipoises to 2,000,000 centipoises at room temperature and having an organic group to silicon atom ratio of from about 1.95:1 to 2:1 (2) from 0.1 to 10 parts by weight of an organosilicon compound of the formula:

$$Si[(OCH_2)_nOR]_4$$

wherein each $n$ is an integer having a value from one to about five, and each R is an alkyl group containing from one to about four carbon atoms, and (3) from 10 to 200 parts by weight of a filler.

4. A composition of matter curable to an elastomer at room temperature which is stable when maintained under refrigeration in a closed container and which comprises (1) 100 parts by weight of a diorganopolysiloxane fluid having a hydroxy group bonded to each of the terminal silicon atoms thereof, said fluid being an essentially linear diorganopolysiloxane consisting essentially of units of the formula:

wherein R and R′ are monovalent organic radicals containing from 1 to about 18 carbon atoms, said fluid having a viscosity of from 100 centipoises to 2,000,000 centipoises at room temperature and having an organic group to silicon atom ratio of from about 1.95:1 to 2:1, (2) from 0.1 to 10 parts by weight of an organosilicon compound of the formula:

$$Si[(OCH_2)_nOR]_4$$

wherein each $n$ is an integer having a value from one to about five, and each R is an alkyl group containing from one to about four carbon atoms, and (3) from 0.05 to 5 parts by weight of a metal salt of a carboxylic acid wherein the metal is selected from the class consisting of lead, tin, zirconium, iron, cadmium, titanium, calcium and manganese.

5. A composition of matter curable to an elastomer at room temperature which is stable when maintained under refrigeration in a closed container and which comprises (1) 100 parts by weight of a diorganopolysiloxane fluid having a hydroxy group bonded to each of the terminal silicon atoms thereof, said fluid being an essentially linear diorganopolysiloxane consisting essentially of units of the formula:

where R and R′ are monovalent hydrocarbon radicals containing from 1 to about 18 carbon atoms, said fluid having a viscosity of from 1000 to 50,000 centipoises at room temperature and having an organic group to silicon atom ratio of about 1.95:1 to 2:1, (2) from 0.1 to 10 parts by weight of an organosilicon compound of the formula:

$$Si[(OCH_2)_nOCH_3]_4$$

wherein each $n$ is an integer having a value from one to two, inclusive, and (3) from 0.05 to 5 parts by weight of a catalyst selected from the class consisting of the lead, tin, zirconium, iron, cadmium, titanium, calcium and manganese salts of a carboxylic acid containing from 3 to 13 carbon atoms.

6. A composition of matter curable to an elastomer at room temperature which is stable when maintained under refrigeration in a closed container and which comprises (1) 100 parts by weight of a dimethylpolysiloxane fluid having a hydroxy group bonded to each of the terminal silicon atoms thereof, said fluid being an essentially linear dimethylpolysiloxane consisting essentially of units of the formula:

said fluid having a viscosity of from 1000 centipoises to 50,000 centipoises at room temperature and having a methyl group to silicon atom ratio of from about 1.95:1 to 2:1, (2) from 0.1 to 10 parts by weight of the organosilicon compound having the formula

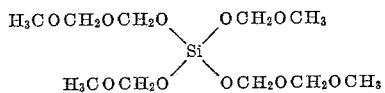

and (3) from 0.05 to 5 parts by weight of stannous octoate.

7. The cured composition obtained from a mixture of ingredients comprising (1) 100 parts by weight of a diorganopolysiloxane fluid having an average of about two silicon bonded hydroxy groups per molecule, said fluid being an essentially linear diorganopolysiloxane consisting essentially of units of the formula:

wherein R and R′ are monovalent organic radicals containing from 1 to about 18 carbon atoms, said fluid having a viscosity of from 100 centipoises to 2,000,000 centipoises at room temperature and having an organic group to silicon atom ratio of from about 1.95:1 to 2:1 and (2) from 0.1 to 10 parts by weight of an organosilicon compound of the formula:

$$Si[(OCH_2)_nOR]_4$$

wherein each $n$ is an integer having a value from one to about five, and each R is an alkyl group containing from one to about four carbon atoms.

8. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane consisting essentially of units of the formula:

wherein R and R′ are monovalent hydrocarbon radicals containing from 1 to about 18 carbon atoms, said fluid having a viscosity of from 1000 centipoises to 50,000 centipoises at room temperature and having a hydrocarbon group to silicon ratio of from about 1.95:1 to 2:1 and (2) from 0.1 to 10 parts by weight of an organosilicon compound of the formula:

$$Si[(OCH_2)_nOCH_3]_4$$

wherein each $n$ is an integer having a value from one to two, inclusive.

9. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane consisting essentially of units of the formula:

wherein R and R′ are monovalent organic radicals containing from 1 to about 18 carbon atoms, said fluid having a viscosity of from 100 centipoises to 2,000,000 centipoises at room temperature and having an organic group to silicon atom ratio of from about 1.95:1 to 2:1, (2) from 0.1 to 10 parts by weight of an organosilicon compound of the formula:

$$Si[(OCH_2)_nOR]_4$$

wherein each $n$ is an integer having a value from one to about five, and each R is an alkyl group containing from one to about four carbon atoms, and (3) from 10 to 200 parts by weight of a filler.

10. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane consisting essentially of units of the formula:

$$-\underset{\underset{R'}{|}}{\overset{\overset{R}{|}}{Si}}-O$$

wherein R and R' are monovalent organic radicals containing from 1 to about 18 carbon atoms, said fluid having a viscosity of from 100 centipoises to 20,000,000 centipoises at room temperature and having an organic group to silicon atom ratio of from about 1.95:1 to 2:1, (2) from 0.1 to 10 parts by weight of an organosilicon compound of the formula:

$$Si[(OCH_2)_nOR]_4$$

wherein each $n$ is an integer having a value from one to about five, and each R is an alkyl group containing from one to about four carbon atoms, and (3) from 0.05 to 5 parts by weight of a metal salt of a carboxylic acid wherein the metal is selected from the class consisting of lead, tin, zirconium, iron, cadmium, titanium, calcium and manganese.

11. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane consisting essentially of units of the formula:

$$-\underset{\underset{R'}{|}}{\overset{\overset{R}{|}}{Si}}-O$$

wherein R and R' are monovalent hydrocarbon radicals containing from 1 to about 18 carbon atoms, said fluid having a viscosity of from 1000 to 50,000 centipoises at room temperature and having an organic group to silicon atom ratio of from about 1.95:1 to 2:1, (2) from 0.1 to 10 parts by weight of an organosilicon compound of the formula:

$$Si[(OCH_2)_nOCH_3]_4$$

wherein $n$ is an integer having a value from one to two, inclusive, and (3) from 0.05 to 5 parts by weight of a catalyst, selected from the class consisting of the lead, tin, zirconium, iron, cadmium, titanium, calcium and manganese salts of a carboxylic acid containing from 3 to 13 carbon atoms.

12. The cured composition obtained from a mixture of ingredients comprising (1) 100 parts by weight of a dimethylpolysiloxane fluid having a hydroxy group bonded to each of the terminal silicon atoms thereof, said fluid being an essentially linear dimethylpolysiloxane consisting of units of the formula:

$$-\underset{\underset{CH_3}{|}}{\overset{\overset{CH_3}{|}}{Si}}-O$$

said fluid having a viscosity of from 1000 centipoises to 50,000 centipoises at room temperature and having a methyl group to silicon atom ratio of from about 1.95:1 to 2:1, (2) from 0.1 to 10 parts by weight of the organosilicon compound having the formula $$\begin{array}{c}H_3COCH_2OCH_2O\phantom{XX}OCH_2OCH_3\\ \diagdown\phantom{XX}\diagup\\ Si\\ \diagup\phantom{XX}\diagdown\\ H_3COCH_2O\phantom{XX}OCH_2OCH_2OCH_3\end{array}$$

and (3) from 0.05 to 5 parts by weight of stannous octoate.

References Cited by the Examiner
UNITED STATES PATENTS
2,902,467  9/1959  Chipman _____ 260—18

OTHER REFERENCES
Abbott et al.: J. Chem. Eng. Data 6, 437–42 (1961).

LEON J. BERCOVITZ, *Primary Examiner.*

R. W. GRIFFIN, C. W. IVY, *Assistant Examiners.*